Aug. 10, 1948.                G. SWIKART                2,446,966
                            SPECTACLE CASE
                          Filed April 20, 1945

INVENTOR
GEORGE SWIKART
BY
ATTORNEYS

Patented Aug. 10, 1948

2,446,966

UNITED STATES PATENT OFFICE 2,446,966

SPECTACLE CASE

George Swikart, Yonkers, N. Y., assignor to Plastal Corporation, New York, N. Y., a corporation of New York Application April 20, 1945, Serial No. 589,348

1 Claim. (Cl. 206—6)

My present invention relates to spectacle cases. It is a principal object of my invention to provide a case for spectacles having convex lenses which will so hold the spectacles as to minimize scratching and abrasion of the lenses incident to their removal from and insertion into the case as well as that occurring due to the movement of the spectacles in the case while being carried in the pocket. A further and ancillary object is to provide such a spectacle case which will also combine lightness and strength to a high degree.

Other objects of my invention and advantages thereof will be apparent from the following description taken with the annexed drawing, in which Fig. 1 is a plan view of my improved case in open position with spectacles in place;

In carrying out my invention I provide the bottom spectacle-receiving portion of the case with a plurality of ribs which make a point contact only with the convex surface of each lens, such ribs at the same time serving to reinforce the case.

Figure 3:
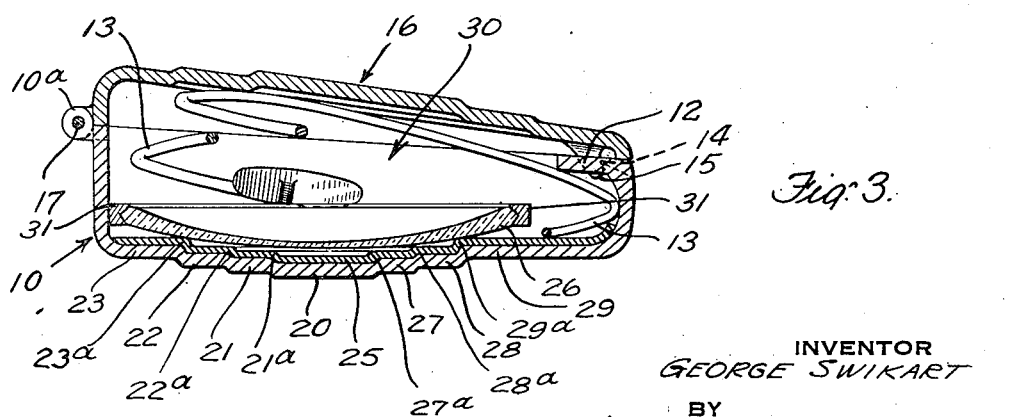
Fig. 3 is a view on an enlarged scale taken on line 3—3 of Fig. 2.

Referring now to the drawings, 10 denotes the bottom spectacle-receiving part which has a peripheral rim 11 having a turned over portion or flange 12 serving to secure in place the bows 13 of the spectacles (Fig. 3). The flange 12 has a notched portion 14 to receive a hook or catch 15 of the cover 16 which is hinged to the lower part 10 by means of a hinge pin 17 which passes through perforated lugs 16a, 16b, 16c, etc. on cover 16 which fit between corresponding lugs 10a, 10b, 10c, etc., on the spectacle-receiving portion 10.

Figure 1:
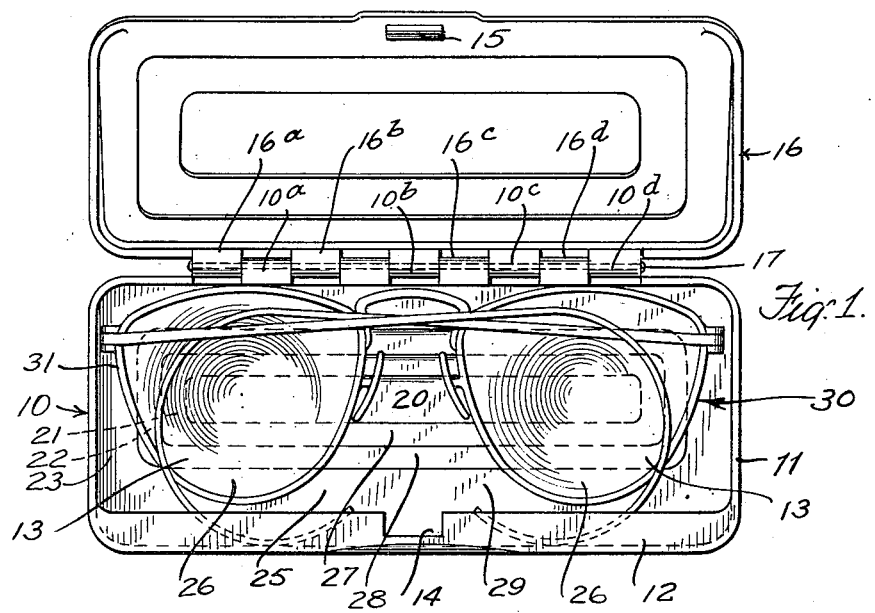
Figure 2:
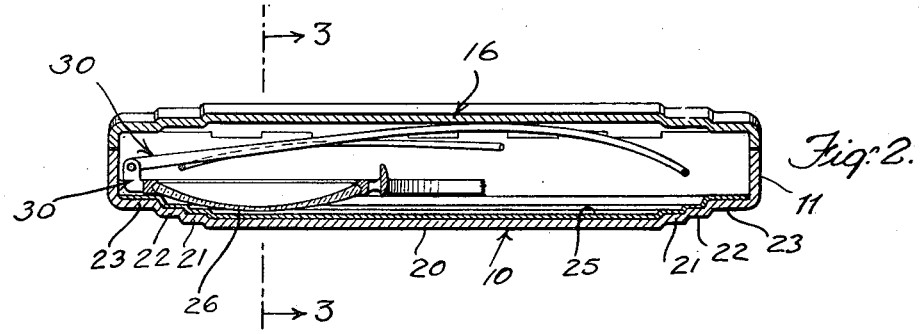
Fig. 2 is a view in lengthwise vertical section of the case in closed position with the spectacles therein.

As clearly shown in the three figures, especially Figs. 2 and 3, the bottom portion of the case has a floor 20 with side walls formed of a series of steps, i. e., steps 21, 22, 23, for the left wall having edges 21a, 22a, 23a, at least one of which makes a point contact (through a soft fabric lining 25) with the left hand portion of convex surface 26 of the spectacle lens. Similarly the right hand wall has a corresponding series of steps 27, 28, 29 and projecting edges 27a, 28a, 29a, one of which makes a point contact with the right hand half of each spectacle lens. The several steps mentioned are so chosen as to afford a one point contact per half lens regardless of the curvature of the lens, such contacts in any event serving to maintain the center of the lenses away from the floor 20. Heretofore it has been customary for the center portion of a spectacle lens to rest on the floor of the spectacle case. Since curvature of the lens surface is much greater than that of the case floor, a rather substantial area in the middle of the lens is in contact with the floor of the case. Because of the unavoidable movement of the spectacles in the case, the center portion of the lens in time will become abraded. Thus, the wear is concentrated at a part of the lens which is most vital to its use, especially for persons wearing lenses for distant vision. In my improved case, instead of having a substantial area of contact, a contact of two points only is had per lens, which makes for much less abrasion; and, moreover, such abrasion as will in time result occurs at those regions in the lens which are perhaps the least used inasmuch as the center of the lens used for distant vision, and the lowest portion thereof used for reading, are maintained out of contact with the case entirely.

It will also be apparent that the construction described in the foregoing also serves the purpose of imparting strength to the case structure; for this reason the same construction is preferably had for the cover 16.

My improved case is shown containing the spectacles denoted generally by 30 of a conventional type having the bows 13, already identified, and rims 31, it being understood that the principle of my invention may be also applied to cases holding other types of spectacles or eyeglasses, rimless or with rims. Because of the high structural strength possessed by my improved case, it may be made with a comparatively small amount of stiff material, either metal or plastics, whereby a high degree of lightness is achieved.

I claim:

In a case for spectacles, a hinged top portion and a bottom portion, said bottom portion having a depression extending longitudinally and substantially medially of the case, said depression being bounded on each side by a plurality of step portions leading upwardly toward each side of the case, said step portions extending the length of the depression and connected at their ends by transverse step portions, said step portions forming ribs adapted to support the lenses when the spectacles are positioned in the cases.

GEORGE SWIKART.

REFERENCES CITED

The following references are of record in the file of this patent:

UNITED STATES PATENTS

| Number | Name | Date |
|---|---|---|
| 2,329,253 | Churchill | Sept. 14, 1943 |

FOREIGN PATENTS

| Number | Country | Date |
|---|---|---|
| 331,441 | Great Britain | July 3, 1930 |